United States Patent [19]
Lachman et al.

[11] 3,885,977
[45] May 27, 1975

[54] ANISOTROPIC CORDIERITE MONOLITH

[75] Inventors: Irwin M. Lachman; Ronald M. Lewis, both of Corning, N.Y.

[73] Assignee: Corning Glass Works, Corning, N.Y.

[22] Filed: Nov. 5, 1973

[21] Appl. No.: 412,862

[52] U.S. Cl. ............. 106/62; 106/73.33; 106/73.4; 106/73.5
[51] Int. Cl. ...................... C04b 35/18; C04b 35/20
[58] Field of Search ......... 106/62, 73.4, 73.5, 73.33

[56] References Cited
UNITED STATES PATENTS

| | | | |
|---|---|---|---|
| 2,731,355 | 1/1956 | Skinner | 106/62 |
| 2,864,919 | 12/1958 | Stringfellow | 106/62 |
| 3,473,999 | 10/1969 | Muchow | 106/62 |

*Primary Examiner*—J. Poer
*Attorney, Agent, or Firm*—Barry S. Bissell; Richard N. Wardell; Clarence R. Patty, Jr.

[57] ABSTRACT

An extruded, honeycombed, monolithic fired ceramic whose primary crystal phase is cordierite and whose microstructure is characterized by a greater than random orientation of the anisotropic cordierite crystallites with their low expansion direction aligned substantially parallel to the plane of the webs of the monolith. The axial expansion coefficient of the honeycomb, with composition near that of stoichiometric cordierite, may be as low as $5.5 \times 10^{-7}$ in./in./°C. or lower in the range of 25°–1000°C.

The product is particularly adapted to use as a catalytic support matrix for emissions control.

29 Claims, 6 Drawing Figures

ANISOTROPIC CORDIERITE MONOLITH

BACKGROUND OF THE INVENTION

Cordierite ($2MgO \cdot 2Al_2O_3 \cdot 5SiO_2$) is known to display very low thermal expansions over wide temperature ranges. A substantial amount of this phase, therefore, imparts in a ceramic body an excellent thermal shock resistance when subjected to rapid and severe changes in temperatures. The disadvantage of cordierite, as reported in the literature, is the relatively short firing range of a batch composition near stoichiometric cordierite. The reported cure for this ill has been to add various materials, for example, alumina and zirconia compounds, to broaden the range. Unfortunately, as the present inventors have discovered, these impurity additions have an adverse effect on the low thermal expansion of cordierite. Similarly, the inventors have discovered that impurities contained in the batch raw materials, particularly calcia and the alkalis, soda and potash, are equally or perhaps more injurious to the thermal expansion properties. The absence of these materials through the use of high purity raw materials enables the firing temperature to be raised because of the elimination of the lower temperature liquid formation.

The use of impure raw materials and the deliberate addition of other impurities to the cordierite batch has had the additional impact of hiding the effect of the anisotropic cordierite crystal on the overall thermal expansion characteristics of a fired body. Previous investigations of ceramic bodies have had the magnitude of the contraction along the cordierite c-crystal axis, in the temperature range of 25°–450°C., masked by the additive expansions of all impurity phases, solid solutions and by the random orientation of cordierite crystallites. the present inventors have found that, (1) by reducing the amount of impurities, and (2) by orienting the cordierite crystals in the fired body, the anisotropy of the thermal expansion in the body becomes apparent. Further, the present inventors have found that they are able to reproducibly orient the cordierite crystals and exploit the anisotropic behavior. In particular, the inventors have fashioned a product, which because of its geometry, is able to accept the benefits of the low thermal expansion direction without the detriments of the high expansion direction in the fired body.

PRIOR ART

Some work has been done in the area of orienting clay particles in plastic batches. W. O. Williamson, in his paper on Sequence and Effects of Microstructure in Clay Ceramics (Proc. Brit. Ceram. Soc., No. 20, 117-32, 1972), has made discoveries in the orientation of clay platelets in green ceramic bodies and he focuses light on the inherited properties of fired bodies from their precursor batch materials. Absent in his report, however, is the heretofore unexpected result found in the present invention, viz. that a cordierite crystal may be reproducibly oriented in the fired body by orienting the clay precursors in the correct habit. Also unnoticed in Williamson's work in the beneficial result which can be obtained by orienting an anisotropic crystal and then using the favorable properties exhibited in one crystal dimension while discarding the equally unfavorable effects in a perpendicular dimension.

Gugel and Vogel (Ber. Dtsch. Keram. Ges. 41:3, pp. 197-205, 1964) have recognized the anisotropy of crystal cordierite and the negative expansion along the c-axis at low temperature. Their work has neither disclosed nor suggested the manner of beneficially using this anisotropy or of reproducibly inducing the ordered anisotropy in a fired cordierite body.

SUMMARY

Our invention comprises the discovery that the clay habit determines the orientation of the resulting cordierite crystallites in the fired polycrystalline body. The invention further comprises the orientation of cordierite crystallites in a fired ceramic within a compositional area of 41–56.5% $SiO_2$, 30–50% $Al_2O_3$, and 9–20% MgO, to provide a very low expansion parallel to the oriented c-axes of the crystals. A substantially greater than random orientation of c-axes in desired directions is accomplished by orienting the clay platelets in a consistently planar orientation in a formed batch prior to firing. Subsequently, the green ware is thermally processed in such a fashion as to cause the development of cordierite crystals with an inherited favorable orientation. Usual firing temperatures are 1340°–1450°C. Particularly useful forms of the invention are flat or thin bodied ceramic articles or honeycombed bodies having thin walls or webs wherein c-axis orientation is in or toward the plane of such ceramics or webs.

The present inventors have made a polycrystalline monolithic cordierite honeycomb product which is characterized by a microstructure of oriented cordierite crystals with sufficient orientation of c-axis in the web planes of the honeycomb to contribute to a coefficient of thermal expansion of as low as $5.5 \times 10^{-7}$ in./in./°C. or lower over 25°–1000°C. in the compositional range, on the oxide basis, of 41–56.5% $SiO_2$, 30–50% $Al_2O_3$, and 9–20% MgO. The product excels in its resistance to thermal shock when exposed to wide deviations in temperature because of heretofore undiscovered low thermal expansion. The cordierite crystallites' a-axis contribution produces a high expansion direction perpendicular to the low expansion direction in the monolith but the product geometry obviates any problem by providing the high expansion direction transverse to the smallest dimension of very thin webs, which additionally have internal space within the monolith in which to expand.

An oxide range of 46.6–53% $SiO_2$, 33–41% $Al_2O_3$, 11.5–16.5% MgO is preferred by the inventors because it distinguishes a minimum expansion area in the compositional diagram suitable for commercial exploitation in a catalytic support matrix.

A narrower oxide range of 48–51.6% $SiO_2$, 34.2–39.5% $Al_2O_3$, and 12.5–15.5% MgO, is further preferred because it defines an area in which coefficients of thermal expansion in fired bodies are less than $10 \times 10^{-7}$ in./in./°C. over 25°–1000°C.

The present invention further comprises the substitution of various oxides for magnesia in the low expansion magnesium cordierite of the invention. Specifically, 25% of the MgO may be replaced by an equal number of formula weights of NiO (in the form of oxide, sulfate, carbonate, etc.). Similar replacements may be made for 15% of the MgO by CoO, 40% of the MgO by FeO, 98% of the MgO by MnO or 15% of the MgO by $TiO_2$.

It is, therefore, the object of the invention to provide a very thermal stress resistant ceramic substrate.

A further object is to provide a process by which the coefficient of thermal expansion of a cordierite body can be reduced across at least one of its dimensions by orienting the cordierite crystals such that the low expansion c-crystal axes are oriented in a greater than random fashion in desired directions.

A still further object is to apply the orientation method invention to a ceramic substrate, to provide an anisotropic cordierite monolith with a honeycombed structure having a great resistance to thermal shock, particularly in its application as a catalyst support.

A still further object is to produce a cordierite ceramic body of sufficient purity such that the thermal expansion due to impurities is minimized.

Figure 2:
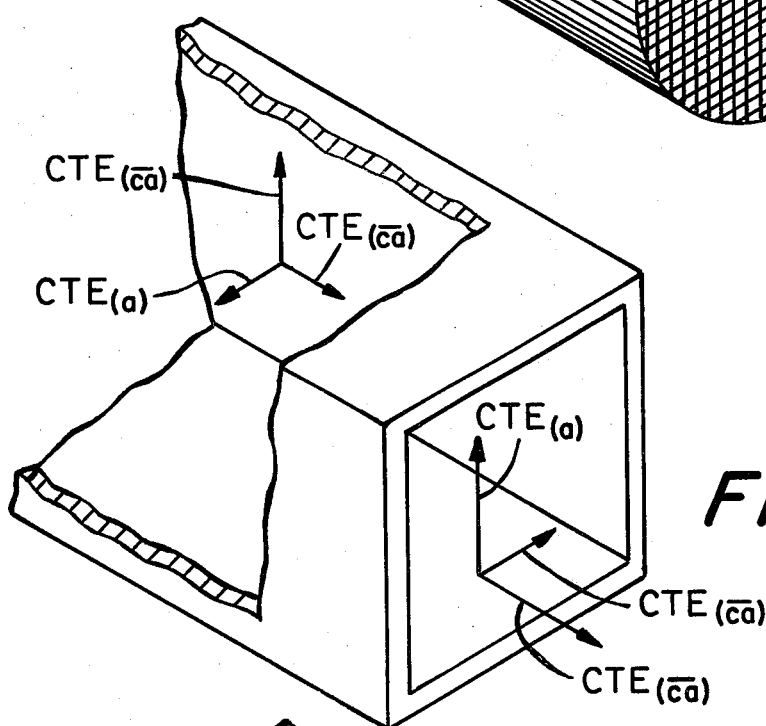
FIG. 2 shows a single cell of the honeycomb structure of FIG. 1 and the coefficient of thermal expansion expected in three directions (axial and radial to the cell and transverse to the cell wall) when all cordierite crystallites are ideally oriented such that the c-axes and one-half of the a-axes lie in the plane of the cell wall. Two assumptions are used in arriving at the depicted ideal orientation. One is that cordierite crystallites have hexagonal crystal structures and the other is that one a-axis of each hexagonal crystallite also lies in the cell wall (even though the a-axis need not lie in the cell wall, but must always be perpendicular to the c-axis in hexagonal cordierite). These assumptions will be adhered to herein because of the low orthorhombicity of cordierite.

Under the assumptions, the coefficient of thermal expansion (CTE) in the axial and radial directions, as shown in FIG. 2, is equal to the average CTE contributions of c-axes and a-axes in those directions. Since there is an equal number of c-axes and a-axes in the web plane, the CTE in the axial and radial directions is noted as $CTE_{(ca)}$, which is the coefficient of thermal expansion averaged over the theoretical c-axis and a-axis CTE of hexagonal cordierite. Further, any direction in the web plane (under the previous assumptions) has an expansion equal to the average of the a-axes and c-axes contributions in that direction.

Finally, under the assumption that all of the c-axes and one-half of the a-axes of hexagonal cordierite crystallites are in the web plane, the other a-axes are normal to the web plane and the CTE transverse to the web plane will be noted $CTE_{(a)}$, the theoretical a-axis CTE in hexagonal cordierite.

Figure 3:
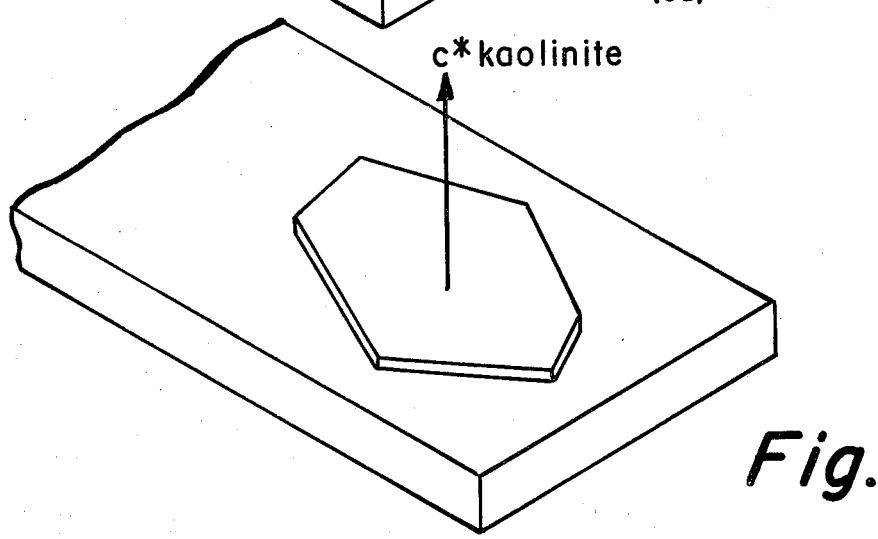

FIG. 3 exhibits the idealized planar orientation of the clay platelets in a thin ribbon of green ware with the c*-crystal axis as shown.

Figure 4:
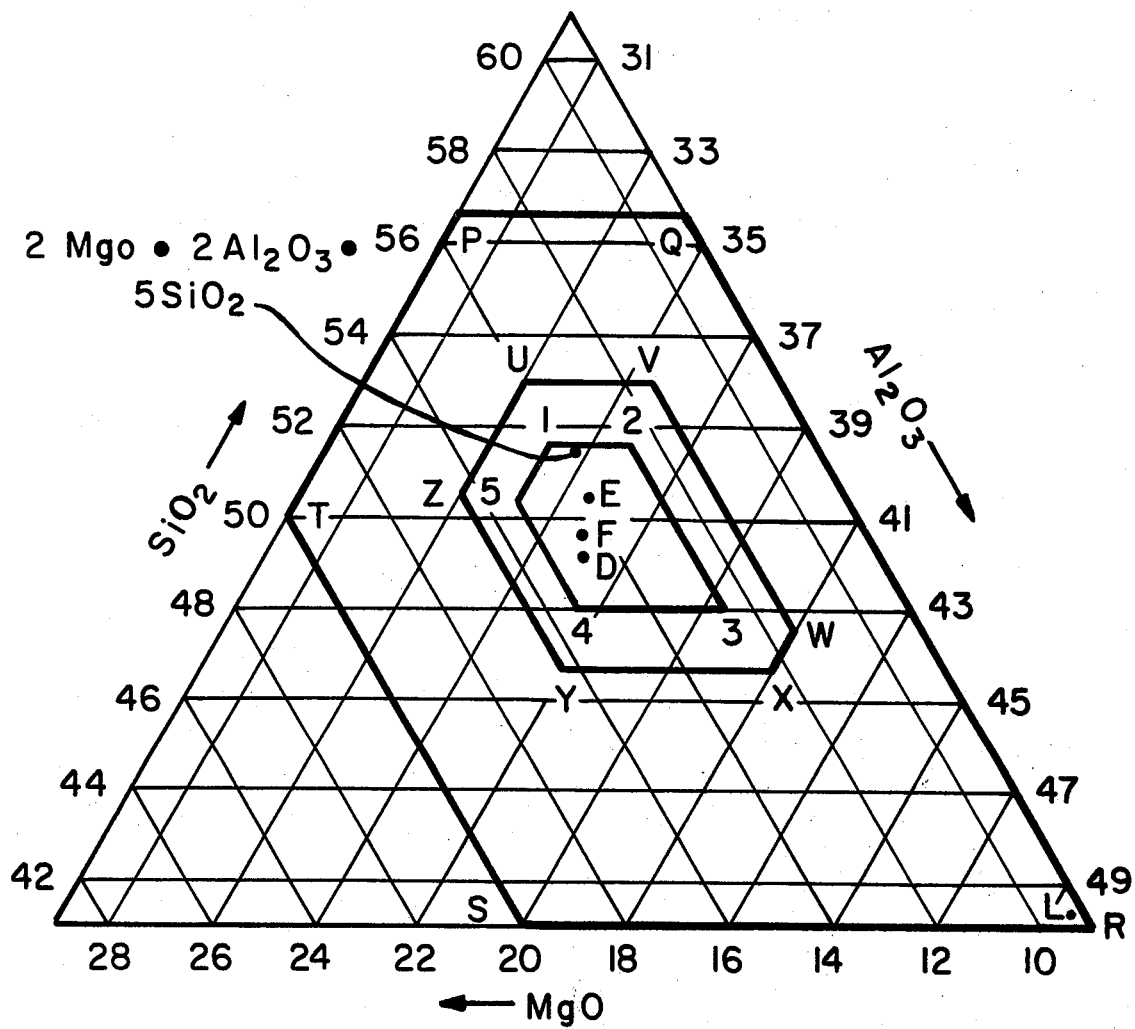

FIG. 4 is a ternary compositional diagram for the $MgO-Al_2O_3-SiO_2$ system showing the broad area of invention PQRST, and the preferred areas of invention, UVWXYZ and 12345.

Figure 5:
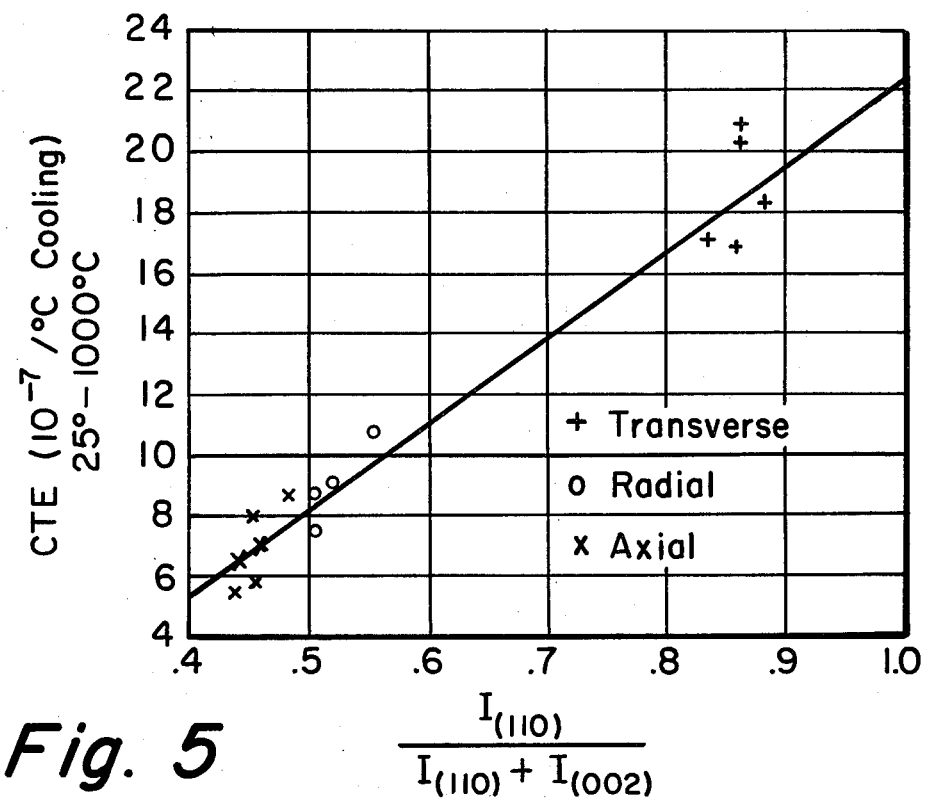

FIG. 5 is a graph showing the closely linear relationship between the coefficient of thermal expansion in a particular direction in an anisotropic fired cordierite body and an X-ray intensity ratio (as defined infra in the Detailed Description of the Invention) in the particular direction.

Figure 6:
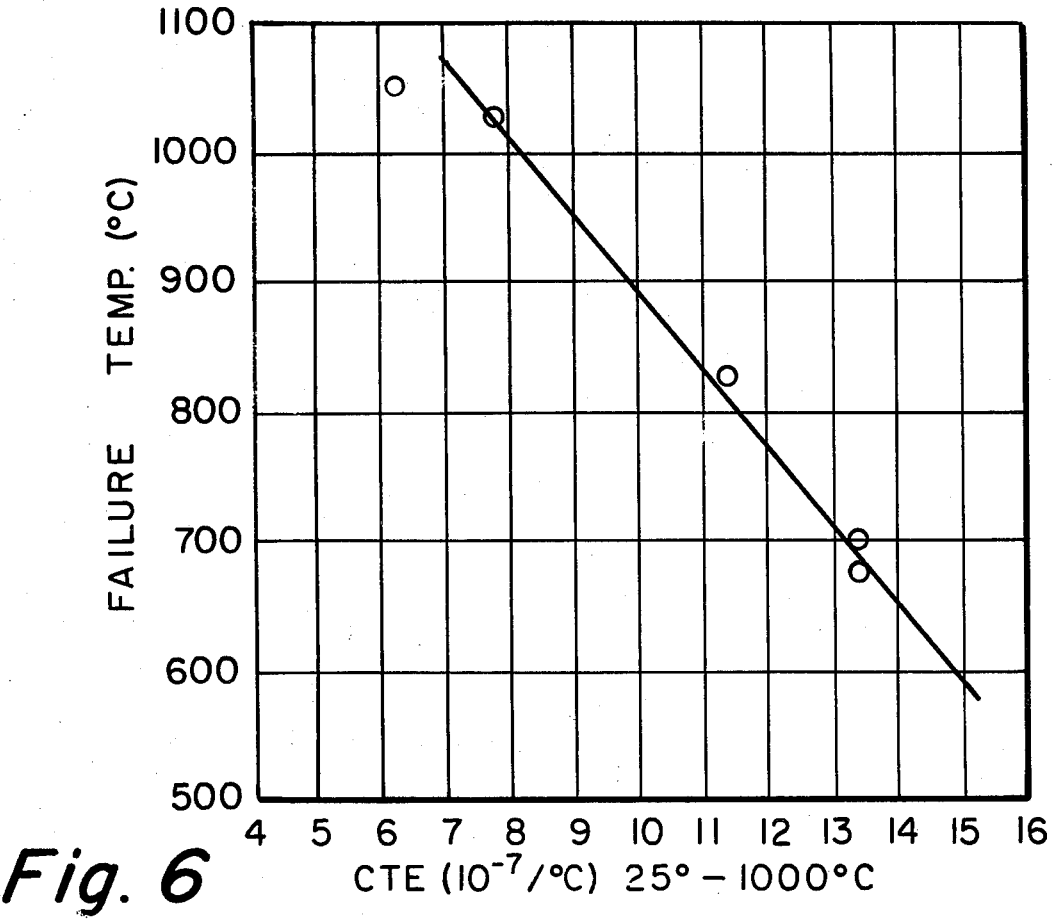

FIG. 6 is a graph showing a general relationship of thermal shock to thermal expansion in a fired ceramic honeycomb body of the present invention. Thermal shock is quantified in terms of the failure temperature for samples in the experimental test.

DETAILED DESCRIPTION OF THE INVENTION

Orientation

Thermal stress resistance of a fired ceramic body is related to the thermal expansion of that body when subjected to temperature change. Exemplifying data of this relationship is contained herein in FIG. 6 and Example 3. The coefficient of thermal expansion (CTE) is then a convenient parameter for comparing the relative thermal stress resistance of various bodies. In the $MgO-Al_2O_3-SiO_2$ system there has been much work done which reports very low expansions for compositions containing cordierite. The present inventors, however, not only have found a compositional range with an extremely low thermal expansion coefficient (less than $11.0 \times 10^{-7}$ in./in./°C. over 25°–1000°C.), but have found a process by which a fired body, with a cordierite crystal phase, can be induced to display anisotropic expansion properties, such that in at least one measuring direction the CTE is reduced to as low as $5.5 \times 10^{-7}$ in./in./°C. or lower over 25°–1000°C. This is accomplished in a process whereby the low expansion direction of the cordierite crystallites (along c-axis) are oriented in or toward particular directions. Sufficient crystals are oriented so that the contribution of the low expansion c-axes is at least noticeably greater (than in a random body) in the oriented directions, and the CTE is thereby reduced in those directions. Conversely, the CTE's in the directions normal to the c-axes are increased due to the increased contribution of the a-axes (high expansion) orientation.

The value of the present invention, therefore, is especially great in those cases where very low expansion is desired in one or more dimensions of a body while a high expansion perpendicular to those low expansion dimensions will not be detrimental to the body. Such is the case with a honeycombed structure having a matrix of thin walled cells extending from one end of the structure to the other as stereotyped in FIG. 1. In the ribbon or web of material of the monolithic matrix, the cordierite crystals are ideally oriented such that the c-axes are somewhere in the plane of the web or ribbon and the high expansion a-axes are found generally concentrated transverse to the web. This means that the expansion perpendicular to the plane of the webs will be greater than that in the plane of the webs. The c-axes of the cordierite crystallites need not always lie parallel to the direction of extrusion of a web or ribbon or directly in the plane of the material, so long as more than two thirds of their contributions to the CTE of a body are in directions in the plane of the web rather than transverse to the web. The inventors believe that such is the case when the c-axes of the cordierite crystallites on the average make an angle of less than 35° with the plane of the web.

What we term "contribution" by the c-axis to the expansion in any direction (especially in the web plane) is the resolution of the c-axis expansion in that direction as determined by the product of the c-axis expansion and the direction cosine of the angle which the c-axis makes with that direction. In an ideal circumstance, the c-axes make angles of 0° to the plane of the web and all of the c-axes expansions are parallel to the plane of the web and none normal to the web plane. This ideal situation is shown in FIG. 2 wherein all of the expansion normal to the web planes is contributed by the a-axes expansion while the expansion in any direction in the web plane is the average (notation ca) of the c-axes expansions and the a-axes expansions.

In the invention, the clay platelets orient themselves nearly parallel to the web plane with very little angular deviation from the plane. This means that the c-axes of the cordierite crystallites produced upon sintering, will be concentrated within only a slight angular increment from the web plane, and therefore, will approximate the ideal condition noted in the preceding paragraph.

FIG. 2 shows the directions of the crystal axes when the cordierite crystals in the fired body are ideally oriented in the favorable mode. It can be seen that the expansion in the direction of extrusion will be controlled equally by the c-axis and the a-axis contributions and that expansion traverse in the webs will be controlled by the a-axes. These are represented by the theoretical average of c-axis CTE and the a-axis CTE, ($CTE_{(ca)}$), and by the theoretical a-axis CTE, ($CTE_{(a)}$), respectively. It will also be appreciated that the geometry of the monolith matrix is designed such that the radial expansion will also be controlled jointly by the low expansion c-axes and the high expansion a-axes of the favorably oriented crystallites. The radial expansion is affected largely by the low expansion in the plane of the webs and only minutely by the high expansion of the thin web at the point of intersections with other webs.

To detect preferred orientation in orthorombic cordierite (or hexagonal cordierite known as indialite) we utilize an x-ray powder technique on one oriented slice cut from the sample and compare the relative peak intensities of key x-ray reflections with those obtained from slices cut in other orientations from the same samples, and also with those obtained from a random orientation sample of the same material (e.g. a powder sample suitably packed to minimize the possibility of preferred orientation; such methods involve the more common powder compacting or consolidating methods of ceramic fabrication. If the c-axes (low-expansion direction) of the cordierite (indialite) crystallites are preferentially aligned in a particular direction (non-random as opposed to random) then the (00$l$) reflections measured from a slice cut normal to that particular direction should be more intense than those observed in a similar slice cut from a body in which the crystallites are random. At the same time the (hko) reflections, which are diffracted from crystallographic planes perpendicular to the high expansion directions and parallel to the c-axis, should be weaker than observed in a random body. Conversely, slices cut in some other directions in this body will show the reverse effect, with the (00$l$) reflections less intense than in the random case and the (hko) reflections enhanced. The expansion perpendicular to these latter slices will be higher than that observed in a body with random crystallites. If I is the intensity peak of reflected x-radiation over background x-radiation, and if the following ratio is set up:

$$\frac{\Sigma I_{(hko)}}{\Sigma I_{(hko)} + \Sigma I_{(00l)}}$$

then for any given sample slice, the value of the quotient is positively correlated with the observed thermal expansion coefficient perpendicular to the sample slice.

The peaks chosen for the formula should:
1. have sufficient intensity to reduce random error from background variations,
2. be appreciably free from interference by peaks from minor amounts of impurity phases,
3. give totals $\Sigma I_{(hko)}$ and $\Sigma I_{(00l)}$ of the same order of magnitude in a random body, and
4. ideally consist of pairs of peaks, one (hko) and one (00$l$), located in approximately the same $2\theta$ region (similar d-spacings) so that absorption, polarization, and direct beam interception factors are uniform.

It is preferred to use the pair of peaks representing d-spacings of 4.68 A amd 4.9 A in cordierite. The former reflection is the (002) reflection of both cordierite and indialite; the latter reflection is the (110) reflection of indialite or the equivalent doublet of (310) and (020) of cordierite (choosing the 17.1A a-cell edge). We will designate this latter peak by its hexagonal indices, (110), since it is usually unresolved due to the geometry of the x-ray technique used and the low orthorhombicity of the cordierite normally developed.

The ratio so obtained:

$$\frac{I_{(110)}}{I_{(110)} + I_{(002)}}$$

(hereafter referred to as the I-ratio or Intensity ratio) is found to be highly correlated with the observed coefficient of thermal expansion (CTE) perpendicular to the slice from which the I-ratio is measured. (See FIG. 5). The value of the I-ratio for a random body or powder (utilizing peak heights) is about 0.65, which means that the (110) peak has about twice the intensity of the (002) peak. Since in a random body the a-axes of indialite (equivalent to the a-axis and the b-axis in cordierite) have twice the contribution to the observed CTE as does the c-axis, the plot of I-ratio against CTE can be reasonably approximated by a straight line. For stoichiometric or near stoichiometric cordierite such a straight line holds for cordierites of similar purity formed from many different batch ingredients. Additionally, similar straight lines of different slope hold for compositions having appreciable amounts of extraneous phases.

We have observed that randomly packed powders and isostatically-pressed (random) bodies yield values of the I-ratio ranging from 0.61 to 0.68 and more commonly ranging only from 0.63 to 0.67. Values lower than 0.61 indicate some degree of preferred orientation, (that is, a greater than random orientation as used herein) of the kind that leads to lower expansion in the direction normal to the slice; the lower the value, the higher the degree of preferred orientation and the lower the expansion in that direction. Conversely, values of I-ratio higher than 0.68 indicate a higher expansion (than in a random body) in the direction normal to that slice.

It is recognized that the values for a random body (or powder) may differ somewhat from one x-ray diffraction setup to another and for different degrees of orthorhombicity in the cordierite. Therefore, the normal value of the I-ratio for a random sample must be established by taking the mean of the values determined from a number of randomly packed powders for a given setup of x-ray apparatus and optic (slit system, x-ray take-off angle, x-ray tube power, sample size and position, etc.). Thereafter, on the same setup, the value of the I-ratio more than 0.04 units removed from the established norm can be considered as resulting from crystal orientation. Specifically, in one experience with a norm of 0.65, a randomly oriented body would be expected to have an I-ratio of between 0.65 ±0.04 or 0.61 to 0.69. Bodies which show intensity ratios below this range on our x-ray equipment, show a greater than random orientation of c-axes. The degree of orientation is directly correlated to the difference between 0.65 and the observed I-ratio. In particular, for bodies used in the present invention, I-ratio values of 0.43, associated with CTE values (25°–1000°C.) of 5.5 to 6.0 × $10^{-7}$ in.-/in./°C. have been observed. In the honeycomb matrix of the present invention, this greater than random orientation of c-axes in the planes of the webs yields a low overall expansion. Therefore, as used in this disclosure, the phrase "greater than random orientation" in a particular direction is chosen quantitatively to mean that the I-ratio of the reflections from a slice cut normal to the particular direction is either less than 0.61 or greater than 0.69 depending on whether the particular direction chosen has a greater than random as concentration of c-axes or a-axes. Random orientation would lead to an I-ratio of 0.61–0.69 while greater than random orientation of c-axes would result in an I-ratio of less than 0.61.

The present inventive process of orienting the cordierite crystals in the favored direction (c-axis in the plane of the web of the monolith matrix or in the plane of a flat or thin bodied ceramics) comprises the steps of (1) selecting batch raw materials including platey materials, (2) blending the raw materials into a plastically moldable batch, (3) anisostatically forming the plastically moldable batch to impart a consistent planar orientation to the platey materials in the resultant green body, and (4) firing for correct development of cordierite phase.

SECTION OF BATCH MATERIALS

Of course, the selection of the quantity of raw materials which comprise the batch will depend on the desired fired composition. For this purpose, the inventors have used high purity clay, talc, silica, alumina, aluminum hydroxides and magnesia-yielding chemicals. In particular, the inventors have used proportions of clay, talc, silica, aluminum hydroxides and alumina so as to produce cordierites analytically consisting essentially of 46.6–53.0% $SiO_2$, 33.0–41.0% $Al_2O_3$, and 11.5–16.5% MgO. Specifically, compositions within 12.5–15.5% MgO, 34.2–39.5% $Al_2O_3$ and 48.0–51.6% $SiO_2$ on the oxide basis have shown expansions of less than 10 × $10^{-7}$/°C.

The crystals may be oriented in a particular direction by orienting the precursor materials in the forming process. This may only be accomplished by the selection of raw materials which lend themselves to the orientation process. In particular, raw materials which are in the form of flat, planar (platelet) particles rather than large isodimensional particles are most useful. Non-platey materials which are used should be fine enough not to disrupt the consistent planar orientation imposed on the platey materials. Acceptable platey materials are found among various talcs and delaminated clays, such as delaminated kaolin. Talc platelets are characteristically larger (10–20 microns) than the clay platelets (0.1–10 microns) and they appear to readily align themselves in the plane of a pressed or extruded ribbon or web.

As used herein, the term platelet is used to describe the shape and geometry of a particle of a particular material. The term denotes a particle which has two long dimensions and one short dimension. That is to say the length and width of the platelet are much larger than its thickness. The length and width need not be equal but they must be much greater than the thickness. For example and comparison, the mineral kaolinite occurs in "stacks" of platelets with one platelet stacked on top of others like slices in a loaf of bread. The stack of platelets forms a rod shaped grouping with the length of the stack being substantially larger than the diameter. These kaolin stacks are then broken apart (delaminated) by mechanical processing and the individual platelets are separated. Now each platelet has a diameter (or length and width) of possibly 10 times its thickness.

For the present invention, the term platelet then will denote a particle shape where the length and width are each at least 4 times larger than the thickness. The terms flat and planar may be used at various times herein to further describe the shape of the platelet.

Our invention comprises the discovery that the clay habit determines the orientation of the resulting cordierite crystallites in cordierite bodies. If the batch materials are kaolin-talc-alumina, the c-axis of the cordierite tends to form in a direction perpendicular to the c*-axis of the original kaolinite. Since the habit of unprocessed kaolinite particles can vary from stacks (elongated parallel to c*) to platelets (elongated perpendicular to c*), the amount and direction of the preferred orientation of the cordierite which forms upon firing is very dependent on the relative amounts of kaolinite with these two habits. The long dimension(s) of the kaolinite particles tend to parallel the plane of an extruded web or ribbon. With kaolinite stacks lying in this plane, the resulting cordierite will have a preferred orientation such that the c-axes of the cordierite crystallites will be found more often (than expected from a random orientation) perpendicular to the plane of the web or ribbon. This causes the thermal expansion perpendicular to the ribbon plane to be lower than that parallel to the ribbon plane. The expansion in the ribbon plane is even higher than that expected in a body with randomly oriented cordierite crystallites.

Figure 1:
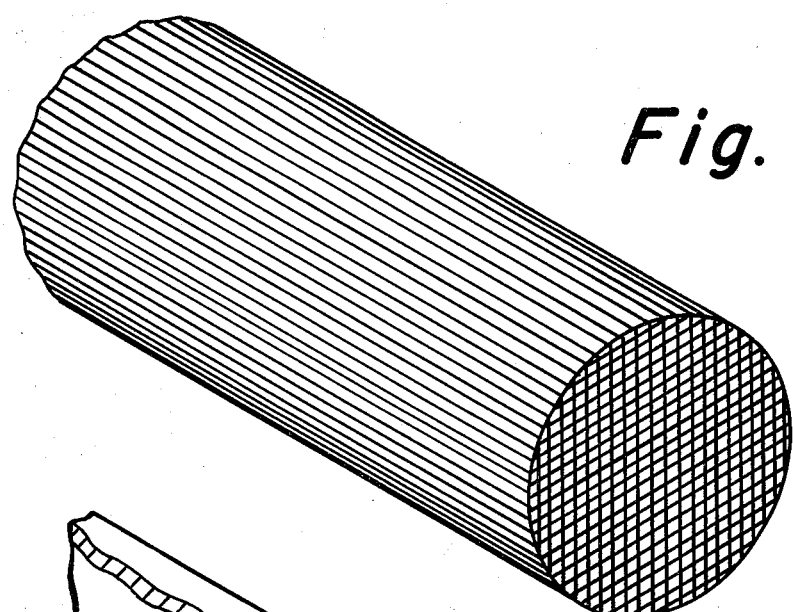
FIG. 1 is an isometric projection of a monolithic honeycombed structure having a matrix of thin walls forming a multiplicity of open-ended cells extended from one end of the structure to the other.

If the kaolinite is in the form of platelets, they tend to parallel the web or ribbon plane leading to a preferential orientation of cordierite c-axes in the web or ribbon plane. In this case the thermal expansion transverse to the webs is higher than the expansion in any direction in the web plane. For matrices as shown in FIG. 1, this means a lower axial and radial expansion, but a higher expansion transverse in the webs.

This does not mean that clays of a stacked habit may not be used in batching the mixture, but if clay stacks are used, the processing (mixing, pre-forming, forming) must be sufficient to break up the stacks into platelets before the plastic batch is finally formed for firing. Therefore the requirement for this step of the present process is to initially select raw clay materials of a platey habit or select clay materials which can be broken down into platey particles during processing and forming of the green ware. This is particularly important where the selection of a non-platey clay is dictated either because it enables an experimenter to optimize other physical properties of the fired body. As long as the selected stacked clay may be delaminated or broken during processing, the orientation may still be accomplished if the other inventive process steps are followed.

Both clays and talcs should be of a platey habit while the alumina may or may not be platey. Preferably, all of the alumina should have a particle size of less than 50 microns and at least one-half of the alumina should further have a particle size of less than 5 microns, preferably less than 2 microns. The finer the particle size of the alumina (and any impurities), the more of these non-platey materials may be tolerated. In general, isodimensional particles (such as quartz, calcined alumina, calcined kaolin, calcined talc, cordierite grog) tend to have a disorienting effect on the platey materials resulting in a reduction of the anisotropy of the fired body.

Non-isodimensional alumino-silicate precursor particles other than platey, such as rod-shaped or acicular particles of appropriate composition and crystal structure, may also lead to preferred orientation of the resulting cordierite. Such preferred orientation may be even more pronounced than that obtainable with platelets. It should be possible by this means to obtain cordierite bodies, with one very low expansion direction (i.e. CTE = $-11 \times 10^{-7}$ to $+5 \times 10^{-7}$, 25°–1000°C.). An example of such a non-clay alumino-silicate is sillimanite.

PROCESSING

Reference above has already been made to the fact that either delaminated clays must be used in the batch composition or a clay must be used which may be broken down into platelets during processing. In this latter case, the mixing should be controlled so that a sufficiently high percentage of the clay stacks are broken into platelets. Further, the mixing step should always be sufficient to produce intimate mixing of the raw material phases in order to allow complete reaction in thermal processing.

Water and extrusion aids are added at this stage to ensure the necessary plastic flow within the batch for orientation of the clay platelets during forming. Sufficient extrusion aids (binders and plasticizers) are added to give plastic formability and green strength prior to firing. In the present invention such materials as methyl cellulose and diglycol stearate have been used with success. Specific quantities found beneficial are noted in the Examples.

Water aids in plastic formability and may be controlled to benefit the specific composition. In the present invention the batch raw materials (clay, talc, and alumina) required between about 27% and about 32% water based on the dry batch. Variations may be required to accommodate a change in raw materials or particle sizes.

FORMING

The plastic batch is amenable to conventional ceramic forming processes. The requirement is that the forming be anisostatic so that the clay platelets will be oriented by the plastic flow. The inventors have found the extrusion process to be ideal for producing oriented clay platelets in green ware and for producing thin web and thin ribbon material with the desired orientation of clay platelets in the plane of the webs. Other forming methods such as rolling and pressing of sheets to be assembled into honeycombed structures or thin sheets to be used by themselves produce similarly favorable orientation.

The term anisostatic is used herein to contrast the conventional isostatic methods of forming wherein all points on the surface of body to be formed are subjected to equal forces. This isostatic forming would tend to leave the clay and talc particles of the batch in the same orientation imparted during mixing and preforming preparation. Anisostatic methods of forming, as used herein, do not cause equal forces on all points of body being formed and hence the clay and talc platelets are caused to slip and rotate in the plastic batch while trying to reach a planar orientation. In pressing or extruding a ribbon of material, for example, the orientation would result in an ideal configuration of the clay particles as shown in FIG. 3. Notice that this results in the desired orientation of the c*-axis of the clay.

The inventive process is principally concerned with production of thin ribbon and web materials where the cordierite crystals can be oriented to produce a low expansion direction in the plane of the ribbon and a high expansion direction transverse to that plane and parallel to the thin dimension.

In particular, the present invention is extremely significant in a ceramic honeycomb body. The open celled, thin walled honeycomb is formed such that the orientation of cordierite effects low expansion along the axes of the cells and high expansion across the thin wall, but not across the entire body normal to the cell axes. The effect of the high expansion direction of the cordierite crystal is thereby minimized in the external expansion of the honeycomb normal to the cell axes by orienting the high expansion in a very thin section and by having internal space to allow wall expansion into the cells. Typical honeycomb structures useful with the present invention have wall thicknesses of between about 3 mils and about 50 mils with cell densities of between about 900 cells/square inch to about 50 cells/square inch. The thickness of the thin walls is not critical in obtaining orientation but the thinner walls enable more complete and more consistent planar orientation.

Other shapes can be extruded or otherwise formed and the anisotropy of the expansion will be controlled by the orientation imparted to the clay platelets during forming.

FIRING

The firing range for the cordierite body should be 1340°–1450°C. with a soak time sufficient to yield a substantially complete reaction to the cordierite phase. Soak times of 6–12 hours have been used in the process.

OTHER ANISOTROPIC PROPERTIES

Even though the present invention has been most concerned with the thermal expansion properties of fired cordierite bodies in which the crystallites have been oriented, the inventors are equally well aware of the other anisotropic properties of such a fired ceramic. Various mechanical, electrical and thermal properties may be affected by the induced anisotropy in the body and therefore may be exploited in the proper circumstances.

EXAMPLES OF PREFERRED EMBODIMENT

In the examples, raw materials having the following essential chemical analyses, on the oxide basis, were used. Average particle size is abbreviated APS.

|  | $SiO_2$ | $Al_2O_3$ | MgO | CaO | $K_2O + Na_2O$ |
|---|---|---|---|---|---|
| Georgia Kaolin Hydrite MP (APS - 9.7 microns) | 45.3 | 38.38 | 0.04 | 0.05 | 0.31 |
| Glomax - LL (APS 1.9) | 53.8 | 44.4 | .23 | .05 | .34 |
| Kaopaque 10 - (APS - 10) | 45.1 | 39.1 | .05 | .05 | .30 |
| 30 - (APS - 30) | 45.3 | 39.2 | .06 | .03 | .32 |
| Harris Mining Sparks Clay (APS - .6) | 46.05 | 37.5 | .32 | .10 | 1.07 |
| B-1000 Nepheline Syenite (APS - 1) | 60.7 | 23.3 | .10 | .70 | 14.4 |
| Pfizer MP 50–35 Montana Talc (APS - 11) | 61.1 | 0.93 | 32.2 | 0.13 | 0.03 |
| Pfizer MP 96–28 Montana Talc (APS - 20) | 61.1 | 0.93 | 32.2 | 0.13 | 0.03 |
| Pfizer MP 98–25 Montana Talc (APS - 19) | 61.3 | 0.79 | 33.2 | 0.20 | 0.07 |
| Pfizer MP 99–54 Cercron Calcined Talc) (APS - 25) | 63.9 | 0.98 | 34.0 | 0.12 | 0.02 |
| Penn Glass Sand Corp. Supersil Fused Silica (−200 mesh) | 99.7 | .10 | — | — | — |
| Alcoa Hydral 705 $Al_2O_3$ (APS - .77) | .04 | 64.7 | — | — | 0.61 |
| Alcoa Hydral 710 $Al_2O_3$ (APS - 1.4) | .04 | 65.4 | — | — | 0.45 |
| Alcoa A-2 $Al_2O_3$ (APS - 5.8) | 0.02 | 99.2 | — | — | 0.45 |

Experimental accuracy on the CTE measurements in the Examples was $\pm 0.5 \times 10^{-7}/°C$.

EXAMPLE 1

The effect of platelet clay in an extruded body versus the effect of stack clay has been demonstrated by extruding two compositions, A and B, which differ only in the clay habit. Both A and B were prepared by normal ceramic batching, blending and extrusion. Each contained 35.77% Montana Talc, 16.06% $Al_2O_3$ (2 micron average particle size), and 48.17% Kaolin. The kaolin of body A was stacked clay (G.K. Hydrite MP) while the kaolin in body B was platelet clay (Kaopaque 30). For good orientation, thin ribbons 2 inches wide by one-eighth inch in thickness were extruded. The ribbons were then layered to increase the total thickness to 2 inches for more accurate measurement of the expansion across the thickness. After a 1415°C. firing, the following data were recorded.

Table I

CTE ($10^{-7}$ in./in./°C., 25°–1000°C.)

|  | Axial | Transverse |
|---|---|---|
| A | 16.3 | 9.1 |
| B | 9.2 | 15.0 |

As predicted, both the stacks and the platelets aligned themselves fairly in the plane of the ribbon. But because of the different orientation of the clay c*-axis in the green body, the cordierite crystal is oriented differently in the fired body. In body A the low expansion direction of the cordierite is transverse in the ribbon while in body B it is oriented in the ribbon plane. This orientation is clearly shown in the above Table 1 where the expansion in the low expansion direction is at least 40% less than in the high expansion direction.

The orientation is also clearly defined in the Intensity ratio data. Both compositions as packed powders (random body) had I-ratios of 0.64–0.68. When extruded and stacked, however, the I-ratios were as shown in Table 2.

Table 2

Intensity Ratios for Oriented Crystals

|  | Axial | Transverse |
|---|---|---|
| A | 0.77 | 0.43 |
| B | 0.57 | 0.74 |

This indicates that the clay stacks were oriented in the plane of the ribbon in body A leaving a lower concentration of cordierite c-axes in the fired body than random (random was 0.64–0.68 in these body compositions) in the axial direction. Conversely, body B showed greater than random concentration of cordierite c-axes in the plane of the ribbon due to orientation of platelet clay.

EXAMPLE 2

The effect of anisostatic forming may be seen by comparing the anisotropy of two identical compositions which are formed in two different ways. Body A from Example 1 was compared with a body A-1 of identical composition, but which was isostatically pressed before firing.

Table 3

CTE ($10^{-7}$ in./in./°C., 25°–1000°C.)

| Body | Transverse | Axial | Radial |
|---|---|---|---|
| A (extrusion) | 9.1 | 16.3 | 14.2 |
| A-1 (isostatic) | 12.6 | 12.4 | 11.6 |

It can be seen that the isostatic pressing has left the clay in the ceramic batch in random orientation. The cordierite crystals, therefore, are also in random orientation and the expansion in every direction should approximate the average expansion of the three crystal axes. Within the experimental accuracy, the chart above supports this conclusion. The isostatically pressed body is also useful as a standard for random orientation of crystals. The I-ratios on the body are characteristic of a randomly orientated body. It follows that I-ratios of a sample differing considerably from the I-ratios of a random body would be quantitive evidence of orientation in the sample. For example, the bodies A and A-1 were carefully analyzed with x-rays. Table 4 shows the expected results.

Table 4

I-ratios of Random Orientation vs. Greater than Random Orientation

| Body | Measuring Direction | I-Ratio |
|---|---|---|
| A | axial- | 0.77 |
|  | transverse- | 0.46 |
| A-1 (0.68 | (0.68 perpendicular |  |
|  | dimensions- | (0.65 |
|  |  | (0.67 |

The I-ratio for a packed powder (random orientation) of A composition was 0.64–0.68. This is consistent with the isostatically pressed body A-1 results of 0.65–0.68.

The orientation of Body A is that of greater than random orientation of cordierite a-axes in the plane of the ribbon due to the stacked habit of the precursor clay.

EXAMPLE 3

Some preferred compositions using both stacked clay and platelet clay are given below. The expansions are also shown over various temperature ranges for comparison with the prior art. Much of the prior art work has been reported without reference to the expansion temperature range.

In each case, a 500 gram batch of raw material of Table 5 was blended in a muller. Between 27% and 30% water was added over a 1 hour mullering time.

The compositions were extruded into monolithic honeycombs as shown in FIG. 1. A 25-ton piston type press was used to form the 1 inch diameter monoliths. The extrusion die had 0.010 inch slots in a 0.100 inch × 0.100 inch configuration cut to 0.200 inch depth. An average extrusion pressure of 4000 psi was maintained. (The die body used is disclosed at more length in U.S. patent application Ser. No. 196,986 filed Nov. 9, 1971 and assigned to assignee of this application.)

Samples were then dried in an oven and dry cut into 3 inch lengths. Drying shrinkage was between 4.5% and 5.0%. The samples E and F were fired to 1415°C. for 12 hours, while D was fired to 1400°C. for 6 ½ hours.

Table 5

Compositions by weight (percent)

|  | D | E | F |
|---|---|---|---|
| Hydrite MP | 40.0% | 46.4% | — |
| Kaopaque 10 | — | — | 21.7% |

Table 5-Continued

Compositions by weight (percent)

|  | D | E | F |
|---|---|---|---|
| MP 50–35 Montana Talc | 38.0 | — | — |
| MP 96–28 Montana Talc | — | 18.6 | — |
| MP 98–25 Montana Talc | — | — | 39.2 |
| Supersil (−200M) | — | — | 10.0 |
| MP 99–54 Cercron | — | 17.6 | — |
| Alcoa Hydral 705 Al$_2$O$_3$ | 22.0 | — | — |
| Alcoa Hydral 710 Al$_2$O$_3$ | — | 14.3 | 17.8 |
| Alcoa A-2 (−325M) Al$_2$O$_3$ | — | 3.1 | 11.2 |
| Methyl Cellulose | 3.0 | 4.5 | 4.5 |
| Diglycol Stearate | 0.5 | 0.5 | 0.5 |
| Water | 28.0 | 27.5 | 29.0 |
| Analytical Composition (Normalized) | | | |
| SiO$_2$ | 49.3 | 50.4 | 49.6 |
| Al$_2$O$_3$ | 35.2 | 35.6 | 35.9 |
| MgO | 15.5 | 14.1 | 14.5 |

Table 6

Axial CTE ($10^{-7}$ in./in./°C., 25°–1000°C.)

| Temp. Range | D | E | F |
|---|---|---|---|
| 25° up to 100 | (−)5.33 × 10 | (−)18.00 | (−)8.67 |
| 200 | (−)2.57 | (−) 2.29 | (−)6.29 |
| 300 | 0.91 | 0.55 | (−)4.37 |
| 400 | 3.07 | 2.80 | (−)2.80 |
| 500 | 4.95 | 4.73 | (−)1.16 |
| 600 | 6.52 | 6.52 | 0.435 |
| 800 | 9.55 | 9.35 | 3.42 |
| 1000 | 11.9 | 10.6 | 5.6 |
| I-ratios | 0.58 | 0.65 | 0.45 – 0.48 |

It is important to notice that stacked clay was used in body D, but that the I-ratio indicates an orientation of c-axes in the axial direction. This, as noted in the specification supra, is due to the processing of the clay batch. In this case the long mullering time, the extrusion pressures, the small die opening, plus various other unquantified contributions, caused the stacked clay to be delaminated during processing. The degree of delamination was less than complete, however, as noted by comparing the I-ratio for the platelet clay body F with the above considered body D. The I-ratios are 0.45–0.48 and 0.58, respectively. Body D shows only slightly greater than random orientation while body F is highly oriented. Increased processing time and varying process steps may be sufficient to break the stacked clay into enough platelets to make negligible the difference in orientation between compositions F and D above.

The direct relationship of thermal shock and thermal expansion for solid bodies is known in the art. A similar relationship for a honeycomb ceramic was found in an experimental test using compositions E and F.

FIG. 6 shows the results of the test for body E (points 3, 4, 5) and body F (points 1, 2). The clearly direct correlation of high thermal expansion and low thermal shock is evidenced by the data. The thermal shock resistance was defined in terms of the failure temperature at which one-half of the samples cracked when subjected for 150 cycles to rapid increases in temperature from 25°C. to the failure temperature and rapid cooling to 25°C. The higher the failure temperature, the relatively greater resistance to thermal shock.

EXAMPLE 4

$Na_2O$, $K_2O$ and CaO impurities increase the expansion of cordierite fired ceramics.

Samples were prepared and fired as disclosed in Example 3 for five compositions in the region near stoichiometric cordierite. The impurity concentration varied as shown in Table 8.

Table 7

Batch Compositions of Samples D, H, I, J, and K

| Raw Materials | D | H | I | J | K |
| --- | --- | --- | --- | --- | --- |
| Hydrite MP Clay | 40 | 39.55 | 32.0 | 37.65 | 35.8 |
| MP 50–35 Talc | 38 | 38 | 38.0 | 39.7 | 37.8 |
| Alcoa Hydral 705 Alumina | 22 | 22.1 | 17.6 | 12.1 | 23.0 |
| Reagent Grade $CaCO_3$ | — | 0.359 | — | — | 0.329 |
| Harris Mining Sparks Clay | — | — | 8.0 | — | — |
| Alcoa A-2, −325M $Al_2O_3$ | — | — | 4.4 | 7.85 | — |
| B-1000 Nepheline Syenite | — | — | — | 2.70 | 2.56 |
| Mapico Red 516M $Fe_2O_3$ | — | — | — | — | 0.61 |
| Methyl Cellulose | 3 | 3 | 3 | 3 | 3 |
| Diglycol Stearate | .5 | .5 | .5 | .5 | .5 |

Table 9

I-Ratio and CTE ($10^{-7}$/°C., 25°–1000°C.)

| | AXIAL | | TRANSVERSE | | RADIAL | |
| --- | --- | --- | --- | --- | --- | --- |
| | CTE | I-Ratio | CTE | I-Ratio | CTE | I-Ratio |
| F (Compressed Honeycomb) | 5.5–8.6 | 0.44–0.48 | 16.9–21.0 | 0.83–0.88 | 7.5–10.8 | 0.51–0.56 |
| (Honeycomb) | 6.2–7.8 | 0.45–0.48 | not measured across the web | | 10.1–10.8 | not measured |

Table 8

Impurity Concentration and Expansion Coefficient

| Sample Number | Axial Coefficient of Thermal Expansion, 25°–1000°C. in./in./°C. | | Wt.% $Na_2O$ | Wt.% $K_2O$ | Wt.% CaO |
| --- | --- | --- | --- | --- | --- |
| D | 12.0 | | .18 | .07 | .10 |
| H | 15.6 | .20 | .074 | .21 | |
| I | 17.1 | .19 | .16 | .032 | |
| J | 16.8 | .47 | .22 | .04 | |
| K | 19.6 | .49 | .20 | .20 | |

In relation to the expansion of the base line composition D the addition of $Na_2O$, $K_2O$, and/or CaO causes a general increase in the CTE. The use of very pure raw materials, therefore, will result in lower CTE's in a particular composition, with or without oriented clay in the body.

It should be noted, however, the substitution of various oxides for magnesia in the cordierite may be possible without a severe increase in the thermal expansion. Cations which commonly substitute for $Mg^{++}$ are known in the art and have been substituted with success by the inventors. Specifically, in stoichiometric cordierite, substitution for 25% of the MgO may be made with an equivalent number of formula weights of NiO (in the form of oxide, sulfate, carbonate, etc.). Similarly CoO may substitute for 15% of the MgO, FeO substitutes for 40% of the MgO, MnO substitutes for 98% of the MgO and $TiO_2$ may substitute for 15% of the MgO.

EXAMPLE 5

An extruded honeycomb with a matrix of cells as shown in FIG. 1 displays the anisotropic behavior of the oriented cordierite crystallies within each thin web of material, but the CTE's axially and radially are both reduced below the average CTE of a solid cordierite body of the same stoichiometry. The geometry of the honeycomb allows internal expansion of the very thin webs, and because the webs are typically 10 mils thick while the sides of a cell are 100 mils, the high expansion direction transverse to the web contributes only one-tenth as much as the low expansion direction to the radial expansion across the entire body.

Monolithic honeycomb samples were extruded from a batch with composition F from Example 3. One sample was compressed while in the plastic state, perpendicularly to its axis (Diagonally across the square cells) into a solid bar for comparison with the matrix. Fired expansions were taken axially, radially and transversely.

It is seen that the monolithic honeycomb has a geometry which enjoys the benefits of the oriented low expansion crystal axes while it diminishes the effect of the high expansion crystal axes in a radial direction. This is seen by contrasting the transverse expansion in the compressed body with the radial expansion in the honeycomb. The radial CTE of the compressed honeycomb given above is measured in the plane of the compressed body but normal to the extrusion direction.

The I-ratio clearly shows the orientation of the cordierite in the proper relationship to the CTE. A packed powder of F composition gives an I-ratio in any direction of 0.61–0.67. This is characteristic of the nonoriented microstructure. Again, the low I-ratio in the axial direction of the honeycomb indicates a high degree of orientation of cordierite c-axes in the axial direction. This is confirmed in the CTE of about 7 × $10^{-7}$/°C. over 25°–1000°C. As earlier noted, a random oriented cordierite body (isostatically pressed or packed powder) is expected to have a CTE of no less than 12 × $10^{-7}$/°C. over the 25°–1000°C. range. Therefore, the cordierite crystals are clearly oriented in the honeycomb. The I-ratio for the compressed matrix is consistent with the uncompressed matrix in the axial direction.

The experimental data in Table 9 for the compressed matrix is plotted in FIG. 5 to dramatize the apparent linear relationship of the CTE in axial, radial and transverse directions and the I-ratio determined by x-ray reflections from slices cut normal to those directions. Reliance on the I-ratio to detect preferred orientation of cordierite crystallites and hence the CTE is clearly warranted as evidenced graphically in FIG. 5.

EXAMPLE 6

Effective orientation of cordierite crystals is possible when the cordierite phase is only 67.5 volume percent of the body. Body L, prepared as in Example 3 with platelet clay, consisted essentially of 41.9% $SiO_2$, 48.7% $Al_2O_3$ and 9.4% MgO. Principal phases present in the body fired to 1345°C. were 67.5% cordierite, 29.2% mullite and 3.3% sapphirine, on the volume basis. Theoretical CTE for a random body with the above phases was calculated to be $24.5-28.0 \times 10^{-7}$/°C. over the 25°–1000°C. range using conservatively low values for the expansions of mullite and sapphirine (48–56 and $50-75 \times 10^{-7}$/°C., respectively). The experimental CTE in the axial direction, however, was $23.3 \times 10^{-7}$/°C. over 25°–1000°C. and the I-ratio for the cordierite peaks was 0.52, significantly below the random range of 0.61–0.69. These results are evidence that cordierite crystals may be reproducibly oriented even when substantial volumes of other phases are present. Additionally, the effect of the orientation is not masked by the other phases and the body remains anisotropic with respect to the CTE.

EXAMPLE 7

As a demonstration that stacked clay may be (and calcined clay may not be) initially selected for the raw batch and subsequently delaminated by proper processing and oriented in the forming, the inventors made a full substitution of calcined clay (Glomax LL) for the stacked clay of body composition D. The raw material batches were mixed thoroughly and pre-extruded under the same conditions. Samples were prepared by extrusion from each batch, fired, and tested for coefficient of thermal expansion and I-ratio. Body M (calcined clay) had a CTE of 16.4 and an I-ratio of 0.65. Body D on the other hand had a CTE of 10.0 and an I-ratio of 0.48.

Clearly the calcined clay could not be delaminated during processing and therefore showed no cordierite orientation in the fired body. The stacked clay in body D, however, was broken to platelets during processing of the plastic batch and therefore showed preferred orientation in the formed, fired body.

We claim:

1. An anisotropic, polycrystalline sintered ceramic product having cordierite as its primary phase and consisting essentially on an analytical oxide basis of 11.5–16.5% RO, 33–41% $Al_2O_3$ and 46.6–53% $SiO_2$ and having a coefficient of thermal expansion in at least one direction of less than $11.0 \times 10^{-7}$ in./in./°C. over the range of 25°–1000°C., and wherein RO consists essentially of one member selected from the group consisting of NiO, CoO, FeO, MnO and $TiO_2$, the NiO when selected being less than 25% by weight of the RO, the CoO when selected being less than 15% by weight of the RO, the FeO when selected being less than 40% by weight of the RO, the MnO when selected being less than 98% by weight of the RO, the $TiO_2$ when selected being less than 15% by weight of the RO, and the balance of the RO being substantially all MgO.

2. An anisotropic, polycrystalline sintered ceramic product having cordierite as its primary crystal phase and consisting essentially of, by weight on an analytical oxide basis, 11.5–16.5% MgO, 33–41% $Al_2O_3$, 46.6–53.0% $SiO_2$ and having a coefficient of thermal expansion, in at least one direction, of less than $11.0 \times 10^{-7}$ in./in./°C. over the range of 25°–1000°C.

3. A ceramic product as recited in claim 2 which contains less than, by weight, 0.1% CaO and 0.4% $Na_2O$ plus $K_2O$.

4. A ceramic product as recited in claim 2 wherein the product comprises an extruded honeycomb, having a matrix of thin walls forming a multiplicity of open ended cells extending from one end to another end of the honeycomb and the thin walls having a substantially smaller coefficient of thermal expansion in the direction parallel to the axes of the open ended cells than transverse to the thin walls.

5. A ceramic product as recited in claim 4 which consists essentially, on the analytical oxide basis, of 12.5–15.5% MgO, 34.2–39.5% $Al_2O_3$ and 48.0–51.6% $SiO_2$.

6. A ceramic product as recited in claim 5 wherein the total weight of MgO, $Al_2O_3$, and $SiO_2$ is at least 97% of the entire weight of the ceramic product.

7. A ceramic product as recited in claim 2 wherein the coefficient of thermal expansion is between $4.0 \times 10^{-7}$ in./in./°C. and $9.0 \times 10^{-7}$ in./in./°C. over the range 25°–1000°C.

8. A ceramic product as recited in claim 7 wherein the product comprises an extruded honeycomb, having a matrix of thin walls forming a multiplicity of open ended cells extending from one end to another end of the honeycomb and the thin walls having a substantially smaller coefficient of thermal expansion in the direction parallel to the axes of the open ended cells than transverse to the thin walls.

9. A ceramic product as recited in claim 8 which consists essentially, on the analytical oxide basis, of 12.5–15.5% MgO, 34.2–39.5% $Al_2O_3$ and 48.0–51.6% $SiO_2$.

10. A ceramic product as recited in claim 9 wherein the total weight percent of MgO, $Al_2O_3$, and $SiO_2$ is at least 97% of the entire weight of the ceramic product.

11. An anisotropic sintered ceramic product consisting of substantially all crystalline cordierite phase and having a chemical oxide analysis by weight, 9–20% MgO, 30–50% $Al_2O_3$, and 41–56.5% $SiO_2$, and having an I-ratio, defined as:

$$\frac{I_{(110)}}{I_{(110)} + I_{(002)}}$$

in at least one direction of less than 0.61.

12. The product as recited in claim 11 wherein the chemical oxide analysis by weight is 11.5–16.5% MgO, 33–41% $Al_2O_3$, and 46.6–53% $SiO_2$ and the I-ratio in at least one direction is 0.43–0.55.

13. A method of orienting cordierite crystallites in a fired ceramic which comprises:
   a. selecting raw materials comprising clay and such other ceramic materials as will yield an analytical batch composition by weight on the oxide basis of 9–20% MgO, 30–50% $Al_2O_3$, and 41–56.5% $SiO_2$, wherein the clay is selected from the group consisting of platelet clay, stacked clay which can be delaminated into platelets during processing, and mixtures thereof.
   b. intimately blending the raw materials with an effective amount of vehicle and extrusion aids to impart plastic formability and green strength to the raw materials and to delaminate a substantial amount of the stacked clay into platelets,
   c. anisostatically forming the raw materials into a green body to impart a consistent planar orientation to the platelet clay,
   d. drying the green body, and
   e. firing the green body at a temperature and for a time sufficient to essentially complete the cordierite phase formation.

14. The method as recited in claim 13 wherein the clay is platelet clay and the other ceramic materials are selected from the group consisting of talc, alumina, aluminum hydroxide, silica, and mixtures thereof.

15. The method as recited in claim 13 wherein the raw materials are selected to yield a fired ceramic consisting essentially by weight on the oxide basis, 11.5–16.5% MgO, 33–41% $Al_2O_3$ and 46.6–53% $SiO_2$, and the fired ceramic is a monolithic honeycomb having a matrix of thin walls forming a multiplicity of open ended cells extending from one end to another end of the honeycomb.

16. The method as recited in claim 15 wherein the raw materials comprise delaminated kaolin clay, talc and alumina.

17. The method as recited in claim 15 wherein the other ceramic materials are selected from the group consisting of talc, alumina, aluminum hydroxide, silica and mixtures thereof.

18. The method as recited in claim 17 wherein the clay is delaminated kaolin.

19. The method as recited in claim 18 wherein the anisostatic forming method is extrusion.

20. The method as recited in claim 15 wherein the temperature for firing is 1340°C–1450°C.

21. The method as recited in claim 15 wherein the raw materials contain less than, by weight, 0.1% CaO and 0.4% $Na_2O$ plus $K_2O$.

22. The method as recited in claim 13 wherein the raw materials are selected to yield a fired ceramic consisting essentially by weight on the oxide basis, 12.5–15.5% MgO, 34.2–39.5% $Al_2O_3$, and 48–51.6% $SiO_2$ and wherein
   the fired ceramic is a monolithic honeycomb having a matrix of thin walls forming a multiplicity of open ended cells extending from one end to another end of the honeycomb, and
   the coefficient of thermal expansion for the fired ceramic in the direction parallel to the axes of the open ended cells is less than $9.0 \times 10^{-7}$ in./in./°C. over the temperature range of 25°–1000°C and less than the coefficient of thermal expansion of the thin walls in a transverse direction.

23. The method as recited in claim 22 wherein the raw materials comprise delaminated kaolin clay, talc, and alumina.

24. The method as recited in claim 22 wherein the other ceramic materials are selected from the group consisting of talc, alumina, aluminum hydroxide, silica, and mixtures thereof.

25. The method as recited in claim 24 wherein the clay is delaminated kaolin.

26. The method as recited in claim 25 wherein the anisostatic forming method is extrusion.

27. A polycrystalline cordierite sintered ceramic product having a chemical oxide analysis by weight, 9–20% MgO, 30–50% $Al_2O_3$ and 41–56.5% $SiO_2$ and comprising a monolithic honeycomb having a matrix of thin walls forming a multiplicity of open ended cells extending from one end of the product to the other end of the product and being characterized by a microstructure having a greater than random orientation of cordierite crystallites imparting a substantially lower coefficient of thermal expansion to any direction in the plane of the thin walls than transverse to the thin walls.

28. The cordierite product as recited in claim 27 having a chemical oxide analysis by weight 11.5–16.5% MgO, 33–41% $Al_2O_3$ and 46.6–53% $SiO_2$ and a coefficient of thermal expansion in at least the axial direction of less than $11 \times 10^{-7}$ in./in./°C. over the temperature range 25°–1000°C.

29. The cordierite product as recited in claim 27 having a chemical oxide analysis by weight 12.5–15.5% MgO, 34.2–39.5% $Al_2O_3$ and 48–51.6% $SiO_2$ and a coefficient of thermal expansion in at least the axial direction of between $4.0 \times 10^{-7}$ in./in./°C. and $9.0 \times 10^{-7}$ in./in./°C. over the temperature range 25°–1000°C.

* * * * *

UNITED STATES PATENT OFFICE
CERTIFICATE OF CORRECTION

PATENT NO. : 3,885,977
DATED : May 27, 1975
INVENTOR(S) : Irwin M. Lachman, Ronald M. Lewis It is certified that error appears in the above-identified patent and that said Letters Patent are hereby corrected as shown below:

Column 1, line 35, change "the" to -- The --.

Column 6, line 16, change "amd" to -- and --.

Column 7, line 43, change "Section" to -- Selection --.

Column 8, line 59, change stacked to-"stacked" -.

Column 13, lines 16-28, under heading Body remove "(". Remove "0.68"

Under heading Measuring Direction remove "(0.68" insert -- 3 perpendicular -- above dimensions.

Under heading I-Ratio remove "perpendicular" insert --(0.68 -- above (0.65.

Column 15, Table 8, lines 35-45, Sample Number h-k, Move all data figures one column to the right.

Signed and Sealed this eleventh Day of November 1975

[SEAL]

Attest:

RUTH C. MASON
Attesting Officer

C. MARSHALL DANN
Commissioner of Patents and Trademarks

Disclaimer

3,885,977.—*Irwin M. Lachman* and *Ronald M. Lewis*, Corning, N.Y. ANISOTROPIC CORDIERITE MONOLITH. Patent dated May 27, 1975. Disclaimer filed July 23, 1980, by the assignee, *Corning Glass Works*.

Hereby enters this disclaimer to claims 11 through 20 and claim 27 of said patent.

[*Official Gazette September 16, 1980.*]